April 4, 1967  O. E. COE  3,312,502

STORAGE MECHANISM FOR SEAT BELT BUCKLES

Original Filed July 25, 1963  2 Sheets-Sheet 1

INVENTOR.
Orson E. Coe
BY
Barnard, McGlynn & Reising
ATTORNEYS

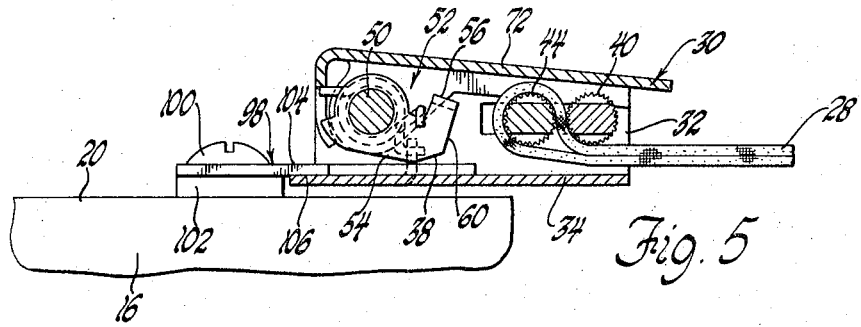

United States Patent Office 3,312,502
Patented Apr. 4, 1967

3,312,502
STORAGE MECHANISM FOR SEAT
BELT BUCKLES
Orson E. Coe, 148 E. Washington, Ionia, Mich. 48846
Continuation of application Ser. No. 297,576, July 25, 1963. This application Feb. 14, 1966, Ser. No. 536,503
10 Claims. (Cl. 297—385)

This invention relates to safety belt assemblies and, in particular, to a storage device for the buckle element thereof, and is a continuation of Ser. No. 297,576, filed July 25, 1963, now abandoned.

Particularly in recent years, the automotive industry and the general public have recognized the desirability of equipping automotive vehicles with safety seat belt assemblies. In fact, particularly in view of the impressive statistics and test data compiled by various safety agencies and the like, it would seem a foregone conclusion that every automobile owner would see to it that his vehicle was equipped with seat belt assemblies. However, notwithstanding the fact that the advantages if seat belt assemblies are almost universally recognized, they have not as yet come into widespread use.

Numerous factors contribute to the apparent reluctance of the general motoring public to equip their vehicles with seat belt assemblies including, by way of example, the fact that such belt assemblies present a rather tangled, unsightly appearance when not in use, lie on the vehicle floor and become dirty, often become jammed between the vehicle body and one of its doors and slip between the seat cushions and are otherwise often hard to retrieve to put in a latched position about the body of a passenger of a vehicle seat. This problem has been attacked in part by the provision of retractor mechanisms operable to automatically retract the seat belt components when the latter are not in use, thereby preventing the belt components from lying across the vehicle seat or on the vehicle floor and otherwise insuring that they will be readily and conveniently available for use while not presenting any danger of becoming fouled in a vehicle door. However, such retractor assemblies add considerable expense to the belt assembly and otherwise are not without their problems. For example, they rely in one way or another on a yieldable retracting means which can apply variable forces about the waist of the vehicle occupant, which forces are objectionable for various reasons known to those acquainted with this art. Furthermore, such retractor mechanisms have been found to be particularly inadequate while retracting the flexible belt to which the safety belt buckle is attached, since the latter is heavy, relative to the latch plate, and is not readily susceptible of retraction.

In view of the foregoing considerations the present invention includes among its objects the provision of a storage device adapted to be mounted adjacent a vehicle seat equipped with a safety seat belt assembly, and is characterized by a storage plate adapted to removably releasably retain thereon the buckle component of the seat belt assembly, whereby the buckle may be stored on the plate when the assembly is not in use and may be readily retrieved therefrom for subsequent latching engagement with the latch plate of the seat belt assembly.

It is yet another object and feature of this invention to provide, in combination with a vehicle seat and a seat belt assembly therefor, a seat belt buckle connected to one end of one of the belts of the belt assembly and adapted to releasably latchingly engage a latch plate carried by the other belt element of the assembly, the buckle including latch means pivotally mounted thereon for movement between latching and unlatching positions relative to the latch plate, yieldable means continuously biasing the aforementioned latch means toward the latching position thereof for latching engagement with the latch plate, manually operable latch release means pivotally mounted on the buckle and being operable to move the latch means to the unlatching position thereof in opposition to the force of the aforementioned yieldable means to release the latch plate for removal from the buckle, and a storage plate mounted in a fixed position adjacent the vehicle seat and adapted to be removably inserted in the buckle to hold the latter thereon when not in use.

More specifically, in accordance with one preferred embodiment of the invention, it is a further object and feature thereof to provide a storage plate of the type aforementioned which includes a surface slidably frictionally engageable with the aforementioned latch means of the buckle, whereby the yieldable means biasing the latch means toward the latching position thereof continuously urges the latter into frictional sliding engagement with the storage plate to retain the buckle thereon while permitting the buckle to be removed from the storage plate by sliding it therefrom and without any manipulation whatsoever of the latch release means.

According to another preferred embodiment of the invention, a further object and feature thereof is to provide a storage plate which is substantially identical to the latch plate cooperable with the buckle in confining a passenger in a vehicle seat, and comprising one or more locking shoulders cooperable with corresponding latching shoulders carried by the aforementioned latch means of the buckle, whereby the buckle is positively latchingly engaged with the storage plate when inserted thereon and operation of latch release means will release the buckle from the storage plate for subsequent use and latching engagement with the latch plate in the usual manner.

These and other objects, features and advantages of the invention will become more apparent hereinafter as the description proceeds, reference being made to the accompanying drawings in which:

FIGURE 5 is a view corresponding generally to FIGURE 4, but illustrating the buckle in a fully stored position on its associated storage plate;

FIGURE 6 is a view corresponding generally to FIGURE 2, but illustrating another preferred form of storage plate;

FIGURE 7 is a side elevational view of the buckle and storage plate of FIGURE 6, with the buckle initially inserted upon the storage plate;

FIGURE 8 is a view corresponding generally to FIGURE 7, but illustrating the buckle in its positive latched stored position on the storage plate; and FIGURE 9 is a view corresponding generally to FIGURE 8, but illustrating manipulation of a latch release means of the buckle to free the latter for removal from the storage plate.

Figure 1:
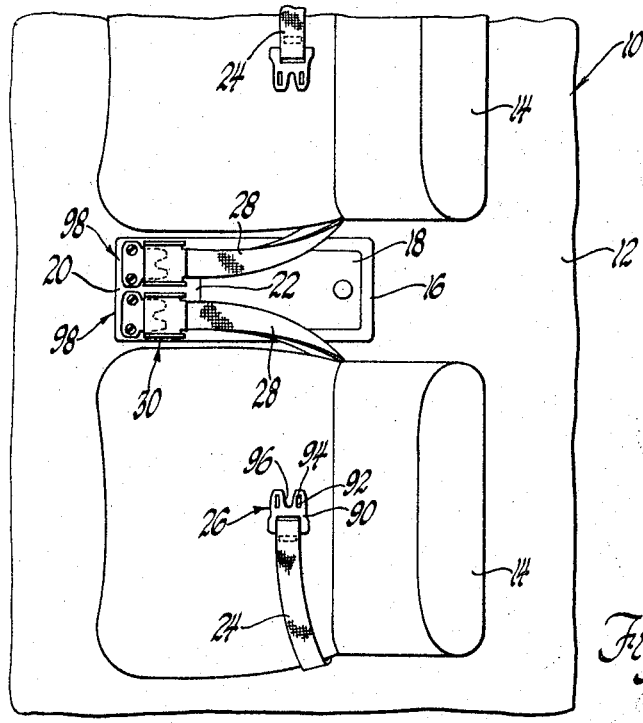
FIGURE 1 is a fragmentary top plan view of an automotive vehicle passenger compartment illustrating one preferred embodiment of the invention, and wherein the seat belt assembly associated with each seat shown has the buckle elements thereof in a stored position on storage plates.
Figure 3:
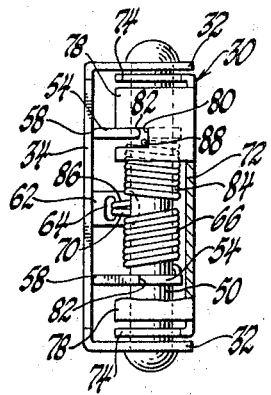
FIGURE 3 is a sectional view taken along line 3—3 of FIGURE 2.
Figure 2:
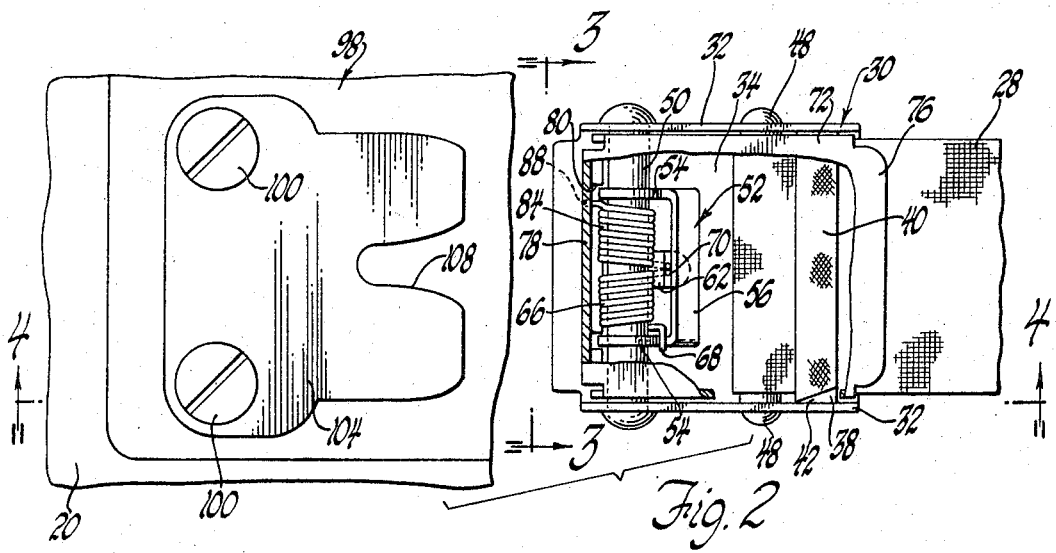
FIGURE 2 is an enlarged fragmentary exploded view of FIGURE 1, partially in section and broken away to illustrate certain details, showing one buckle disengaged from its associated storage plate.

Referring now to the drawings, and particularly FIGURE 1 thereof, the numeral 10 generally indicates the interior of an automotive vehicle passenger compartment comprising the vehicle floor 12, a pair of laterally spaced vehicle seats 14 and a conventional storage compartment or console 16 disposed therebetween and including the usual swingable closure member or door 18 hinged to a top wall 20 of the storage compartment intermediate the ends of the latter along the axis indicated at 22. Identical seat belt assemblies are associated with each seat, and each such assembly comprises a length of flexible belting 24 having one end thereof suitably anchored in a conventional manner as to the floor 12, while a latch plate indicated generally at 26 in FIGURE 1 is suitably connected to the other end thereof in the usual manner. Another length of flexible belting 28 forms the other part of each seat belt assembly, one end of such belting likewise being suitably anchored and a buckle assembly indicated generally at 30 in FIGURE 1 being connected to the other end thereof as will appear hereinafter.

Referring now additionally to FIGURES 2 through 5, it may be seen that the buckle assembly 30 comprises a buckle frame including the laterally spaced upstanding side walls 32 and the floor member 34 extending therebetween. Rearward portions of each of the side walls 32 include opposed parallel slots 36. The opposite end portions 38 of a generally cylindrical knurled locking bar 40 are formed to a cross section corresponding to the shape of the respective slots 36, and are respectively mounted therein at the extreme rearward ends thereof. In this regard, with reference particularly to FIGURES 2 and 4, it will be noted that one end of the knurled locking bar is provided with parallel surfaces 42 above and below the end portion 38 thereof, which surfaces extend obliquely and non-perpendicularly to the axis of the locking bar. As a result, in assembling the locking bar 40 within the respective slots 36, the bar may be angled between the side walls 32 of the buckle frame to insert the opposite end portion of the bar in its slot, followed by swinging the bar counterclockwise in FIGURE 2 about such end portion to insert the other end portion into its associated slot. The oblique surfaces 42 provide the necessary clearance between the side walls of the buckle frame during this assembly operation and, once the bar is in the position shown, the laterally outermost portions of the surfaces 42 will bind against the associated side wall 32 to firmly hold the locking bar in position.

A conventional generally cylindrical knurled snubbing bar 44 has its opposite end portions 46 formed generally to the configuration of the slots 36 and are slidably mounted within the latter, rivets or the like 48 being provided at the outermost ends of the snubbing bar for the purpose of sliding manipulation of the snubbing bar along the slots. The free ends of each of the belts 28 of each belt assembly are adjustably looped around the snubbing bar 44 and between the latter and the locking bar 40 in the usual manner, whereby a tensile force applied to the belting or to the buckle will result in the snubbing bar 44 firmly frictionally seizing the belting against the locking bar 40 to hold the buckle and belting in position as will be readily apparent.

Figure 4:
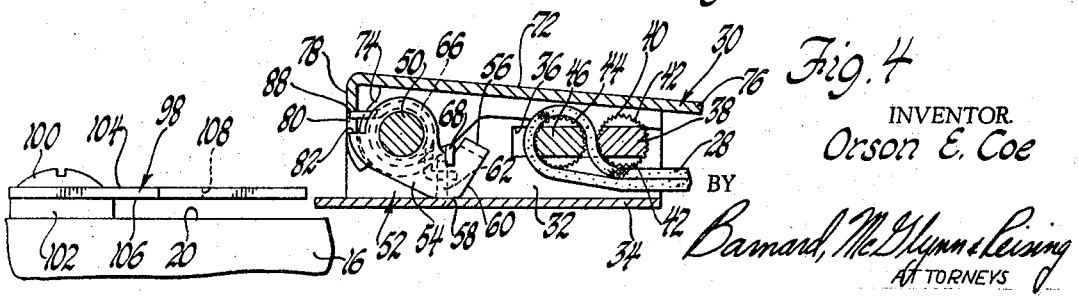
FIGURE 4 is a sectional view taken generally along the line 4—4 of FIGURE 2, and illustrates a buckle just prior to insertion thereof upon its associated storage plate.

A pivot shaft 50 extends between and has its opposite ends suitably fixedly secured to the side walls 32 adjacent the forward end of the buckle frame and in vertically spaced parallel relation to the floor member 34 of the latter. A generally U-shaped latch member indicated generally at 52 comprises the laterally spaced latch arms 54 rotatably journaled about the shaft 50 with the opposite ends thereof interconnected by the crossbar 56. As will be apparent particularly from FIGURES 4 and 5, the latch arms 54 are angularly shaped so as to define a substantially flat latching surface 58 adapted to engage flush with the floor member 34 of the buckle frame, and a latching shoulder 60 adjacent such surface. A lug 62 is struck or otherwise formed from the buckle floor member 34 midway between the side walls 32 just rearwardly and below the pivot shaft 50, and upstands from the floor member and includes an opening 64 therein. An axially coiled spring 66 coaxially surrounds the pivot shaft 50 between the latch arms 54, and has one end 68 thereof engaged with one of the latch arms while the other end 70 thereof is inserted within the opening 64 in the lug 62. As a result, the spring 66 acts to continuously bias the latch member 52 clockwise in FIGURES 4 and 5 to continuously urge the latching surfaces 58 on the respective latch arms 54 toward a latching position engaging flush with the floor member 34 of the buckle as illustrated in FIGURE 4.

A combined latch release lever and cover member 72 substantially completely overlies the floor member of the buckle between the side walls 32 thereof, and includes the depending laterally spaced wall members 74 at one end thereof suitably rotatably journaled about the shaft 50 and, at the other end thereof, a manually graspable lip 76 for the purpose of manipulating the latch release and cover member. The end of the release and cover member opposite lip 76 is provided with a depending wall or flange 78 having a pair of laterally spaced notches 80 therein in the plane of and overlying corresponding detent notches 82 carried by each of the latch arms 54. Another axially coiled spring 84 surrounds the pivot shaft 50 between latch arms 54, and has one end 86 thereof inserted in the opening 64 in the lug 62 while the other end 88 thereof is received in one of the notches 80 of the flange 78 of the cover and release member, whereby the spring 84 continuously biases the cover and release member clockwise in FIGURES 4 and 5 and the positions shown therein.

Each of the latch plates 26 is of conventional construction, and comprises a relatively flat thin piece of metal 90 including a pair of locking apertures 92 having locking shoulders 94 adjacent one end thereof, the locking apertures and shoulders being spaced apart the same distance as the latch arms 54. A longitudinal slot 96 is formed in the leading edge of the latch plate between the locking apertures so as to receive the aforementioned lug 62 upstanding from the floor member of the buckle frame upon insertion of the latch plate into the buckle. As will become more apparent hereinafter, the construction of the latch plates 26 is identical to that of the storage plates illustrated in FIGURES 6 through 9 and to be described.

A storage plate 98, one for the buckle of each seat belt assembly, is suitably fixedly mounted as by the fastener means 100 and washers 102 adjacent the front end of the top wall 20 of the storage compartment 16 out of interfering relation with the closure member 18 therefor. As will be readily apparent, particularly from FIGURES 4 and 5, the respective storage plates are spaced at least slightly vertically above the top wall of the storage compartment by washers 102 so as to accommodate the buckles thereon. Furthermore, each of the storage plates 98 is substantially identical to the respective latch plates 26 in including opposed flat surfaces 104 and 106 and medial longitudinal slot 108 to accommodate the lug 62 on the buckle frame, while differing therefrom in not including the locking apertures 92 of the latch plate.

In operation, it will now be appreciated that each of the seat belt assemblies may be assembled to confine a passenger within a seat merely by inserting the associated latch plate 26 into the end of the buckle frame adjacent the latch member 52, and so that the latch plate 26 slides along the floor member 34 with the lug 62 being received within the slot 96. As the latch plate is inserted in the buckle, it will cam against the latch member causing the latter to pivot away from the floor member 34 and toward the cover and release member 72 which remains stationary under the influence of its spring 84. As the latch arms 54 ride into the locking apertures 92 on the latch plate, the spring 66 biases the latch member back toward the floor member so that the latter is engaged flush by the latch surfaces 58 confined within the locking apertures 92 to thereby cause the inclined latching shoulder 60 of the respective latch arms to latch against the locking shoulders 94 of the latch plate to prevent withdrawal of the buckle from the latch plate.

When it is desired to disengage the buckle from the latch plate, the cover and release member 72 is pivoted upwardly away from floor member 34 resulting in engagement of the notches 80 with the detents 82 on the latch arms 54 followed by concurrent pivotal movement of the cover and release member and the latch member 52 to release the latter from the locking apertures 92 of the latch plate 26 which may then be withdrawn from the buckle.

At this time, the buckle may be stored on its associated storage plate 98 by inserting the buckle toward the latch plate as illustrated in FIGURE 4. As will be apparent, the floor member 34 of the buckle passes beneath the lower surface 106 of the storage plate and the top wall 20 of the storage compartment 16, and the leading edge of the storage plate initially cams against the latch arms 54. Continued movement of the buckle onto the storage plate to the final stored position illustrated in FIGURE 5 causes the latch member 52 to pivot counterclockwise away from the floor member 34 toward the latch release and cover member 72 and independently of the latter. Of course, during this pivoting movement, the spring 66 continuously biases the latch member 52 into frictional sliding engagement with the upper surface 104 of the storage plate, and further results in sliding engagement of the floor member 34 along the lower surface 106 of the storage plate. Ultimately, the final stored position of FIGURE 5 is reached wherein the spring 66 causes the latch arms 54 to frictionally engage the upper surface 104 of the storage plate and the inner surface of the floor member of the buckle to likewise frictionally engage the lower surface 106 of the storage plate. As a consequence of such frictional engagement, the buckle is held in its stored position of FIGURE 5.

When it is desired to again latchingly engage the buckle with the latch plate 26 to confine a passenger within a seat, the buckle is merely withdrawn from the storage plate 98 while the latch member 52 slides therealong. Once the buckle is removed from the storage plate, such as to the position of FIGURE 4, the spring 66 again biases the latch member 52 into engagement with the floor member of the buckle frame for subsequent receipt of the latch plate 26 as previously described. It is to be noted that, due to the frictional engagement of the latch member and the floor member of the buckle with the opposed surfaces of the storage plate 98, it is not necessary to manipulate the cover and release member 72 in the course of disengaging the buckle from the storage plate as is the case when the buckle is latched to the latch plate 26.

Referring now to the embodiment of FIGURES 6 through 9, it will first be noted that the buckle assembly 30 therein shown is identical to that previously described, like numerals therefore being employed to indicate parts thereof corresponding to those previously described. In addition, the storage plates 110 are mounted on the top wall 20 of the storage compartment 16 in the same manner and the same positions as previously described. According to this embodiment, the storage plates 110 are identical to the latch plates 26 in comprising a thin metal body member having opposed flat surfaces 112 and 114, and a pair of laterally spaced elongated locking apertures 116 having locking shoulders 118 adjacent one end thereof. A longitudinal slot 120 is formed in the leading edge of the storage plates to receive the lug 62 on the buckle frame.

In the operation of the embodiment of FIGURES 6 through 9, it will of course be appreciated that the buckle 30 is releasably latchable to the latch plate 26 as previously described and, for that matter, is releasably latchable to the storage plate 110 in a substantially identical manner since the storage and latch plates are substantially identical as aforementioned. Thus, once the buckle 30 is unlatched from the latch plate and it is desired to store the buckle, the latter is first initially inserted on the storage plate 110 whereby the leading edge of the latter causes the latch member 52 to initially pivot away from the floor member 34 to a position such as that illustrated in FIGURE 7, the spring 66 previously described acting at all times to bias the latch member 52 toward the floor member and to hold the latter snugly against the bottom surface 114 of the storage plate. As the buckle is thrust further onto the storage plate to the position shown in FIGURE 8, the latch member 52 rides into the locking apertures 116 permitting the spring 66 to bias the latch arms 54 down toward the floor member so that the latching surfaces 58 thereof engage flush with the floor member 34, and the latching shoulders 60 are engageable with the locking shoulders 118 of the storage plate to positively lock the buckle to the storage plate and prevent removal therefrom.

When it is desired to remove the buckle from the storage plate, the latch release lever 70 is pivoted to the position illustrated in FIGURE 9 resulting, upon engagement of the notches 80 with the detent notches 82 on lateral arms 54, in corresponding pivotal movement of the latch member 52 also as indicate in FIGURE 9. As will be apparent, at this time, the buckle may be slid from the storage plate and the release lever and latch member returned to their normal positions for receipt of the latch plate 26.

While but two forms of the invention have been shown and described, other forms will now be apparent to those acquainted with this art. Therefore, it will be understood that the embodiments described are merely for illustrative purposes, and are not intended to limit the scope of the invention which is defined by the claims which follow.

I claim:

1. The combination comprising a vehicle seat, a seat belt assembly associated with said seat and including a pair of flexible belts, one end of each of said belts being anchored, a latch plate connected to the other end of one of said belts, a buckle connected to the other end of the other of said belts, said buckle comprising a floor and a pair of upstanding side walls defining a latch-receiving slot for receiving said latch plate, latch means mounted between said side walls for movement between a latched position adjacent said floor and an unlatched position away from said floor, and yieldable means continuously biasing said latch means toward said latched position, said latch plate including opposed surfaces having a peripheral configuration defined by leading edge means joining a pair of laterally spaced side edges thereof, said leading edge means being insertable into said latch-receiving slot to engage said latch means to move said latch means away from said floor and toward said unlatched position as one of said surfaces of said latch plate slides along said latch means and the other of said surfaces thereof moves along and coacts with said floor and said side edges thereof coact with said side walls of said buckle to guide said latch plate into the latter, said latch means releasably latching said latch plate upon insertion of said latch plate within said latch-receiving slot of said buckle whereby said belt assembly may confine a vehicle passenger within said seat, and a storage plate mounted in a fixed position adjacent said seat, said storage plate including opposed surfaces having a peripheral configuration defined by leading edge means joining a pair of laterally spaced side edges thereof, said leading edge means of said storage plate being insertable into said latch-receiving slot of said buckle to engage said latch means to move said latch means away from said floor and toward said unlatched position as one of said surfaces of said storage plate slides along said latch means and the other of said surfaces on said storage plate moves along and coacts with said floor and said side edges of said storage plate coact with said side walls of said buckle to guide said storage plate into the latter for supporting said buckle in a stored non-use position, said latch means being biased into engagement with said storage plate by said yieldable means to firmly retain said buckle on said storage plate when said buckle is fully positioned on said storage plate in said stored non-use position.

2. The combination as set forth in claim 1 wherein said yieldable means biases said latch means into frictional sliding engagement with said one of said surfaces of said storage plate with the latter fully inserted within said buckle to firmly frictionally clampingly retain said buckle on said storage plate while permitting said buckle to be slidably removed therefrom without actuating said latch means.

3. The combination as set forth in claim 2 wherein the lateral extent of said surfaces of said storage plate is substantially identical to the lateral extent of said surfaces of said latch plate.

4. The combination as set forth in claim 2 wherein the length and configuration of said leading edge means of said storage plate is substantially identical to the length and configuration of said leading edge means of said latch plate.

5. The combination as set forth in claim 2 wherein said peripheral configuration of said storage plate as defined by said leading edge means and side edges thereof is substantially identical to said peripheral configuration of said latch plate as defined by said leading edge means and side edges thereof.

6. The combination as set forth in claim 1 wherein said latch plate includes locking shoulder means and said latch means includes latching shoulder means for positive latching engagement therebetween upon insertion of said latch plate within said buckle to positively and releasably secure said latch plate to said buckle, and wherein said storage plate includes locking shoulder means corresponding to said locking shoulder means of said latch plate for positive latching engagement with said latching shoulder means to positively and releasably store said buckle on said storage plate.

7. The combination as set forth in claim 6 wherein the lateral extent of said surfaces of said storage plate is substantially identical to the lateral extent of said surfaces of said latch plate.

8. The combination as set forth in claim 6 wherein the length and configuration of said leading edge means of said storage plate is substantially identical to the length and configuration of said leading edge means of said latch plate.

9. The combination as set forth in claim 6 wherein said peripheral configuration of said storage plate as defined by said leading edge means and said side edges thereof is substantially identical to said configuration of said latch plate as defined by said leading edge means and side edges thereof.

10. The combination as defined in claim 1 including a second vehicle seat laterally spaced from said first-mentioned vehicle seat, a storage compartment disposed between said seats, a second seat belt assembly identical to said first-mentioned seat belt assembly associated with said second seat whereby said second seat belt assembly may confine a passenger within said second seat, and a second storage plate identical to said first-mentioned storage plate, both of said storage plates being mounted in fixed position on said compartment, said respective storage plates being removably insertable within the latch-receiving slots of the respective buckles of the seat belt assemblies to store the buckles and the belts connected thereto upon unlatching of the buckles and the latch plates of said seat belt assemblies.

References Cited by the Examiner

UNITED STATES PATENTS

| | | | |
|---|---|---|---|
| 2,869,200 | 1/1959 | Phillips et al. | 24—191 X |
| 3,022,107 | 2/1962 | Daniels | 296—37 |
| 3,083,035 | 3/1963 | Ottosson | 280—150 |
| 3,164,409 | 1/1965 | Rumble | 297—388 |

FRANK B. SHERRY, *Primary Examiner.*

CASMIR A. NUNBERG, *Examiner.*